United States Patent Office 3,264,561
Patented August 2, 1966

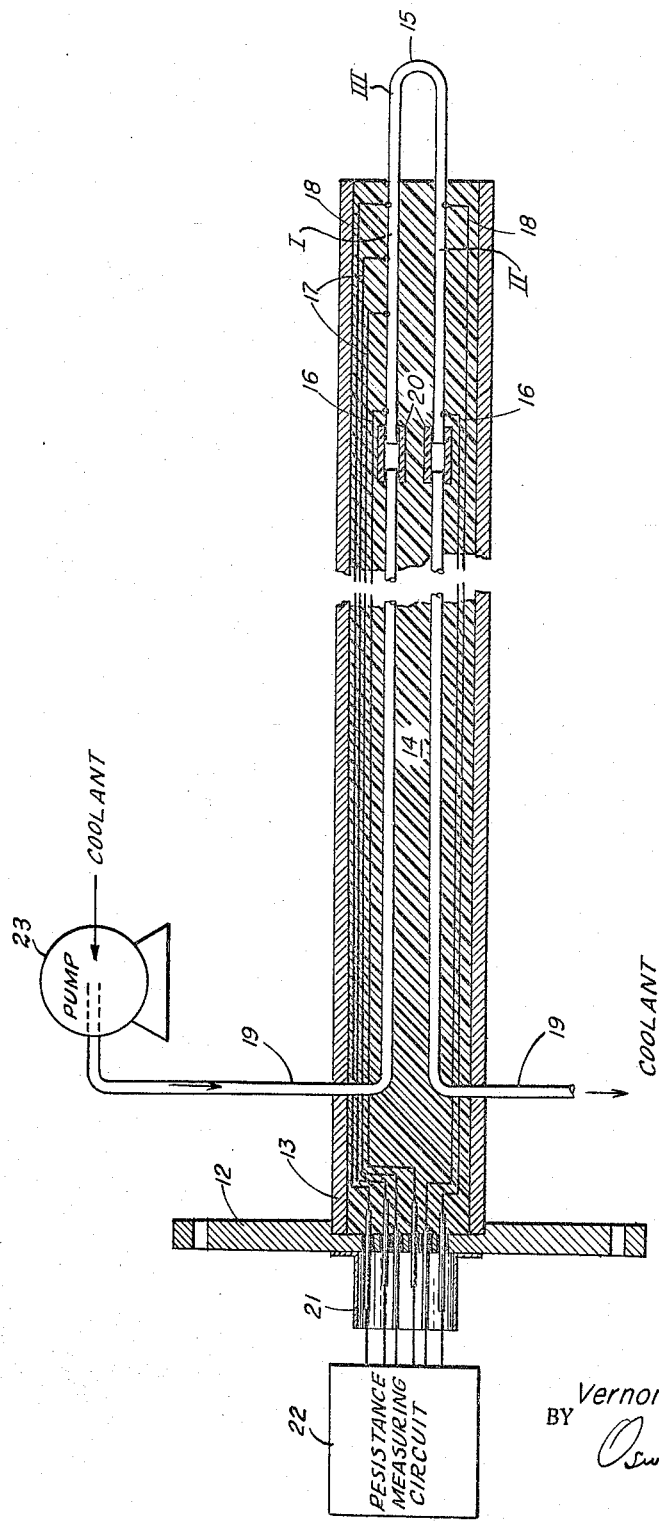

3,264,561
TUBULAR ELECTRICAL CORROSION PROBE WITH COOLANT PUMP MEANS AND RESISTANCE MEASURING CIRCUIT
Vernon M. Gustafson, Pitman, N.J., assignor to Mobil Oil Corporation, a corporation of New York
Filed Mar. 16, 1962, Ser. No. 180,083
1 Claim. (Cl. 324—71)

This invention relates to a means for determining the rate of corrosion for a given material in a corrosive environment, particularly an environment characterized by change in fluid state such as evaporation of a liquid or condensation of a vapor during operation on a process stream.

Quite often, the most corrosive conditions in a given process system exist in the area where vapor is being condensed, such as in a tube-and-shell condenser. At present, the corrosion rate on the tube-side of a condenser cannot be measured easily, without dismantling the equipment, except under simulated laboratory conditions. This is, of course, not as satisfactory as being able to make a continuous check within an operating unit.

It is the primary purpose of this invention to provide means for measuring the corrosion rate, in an actual process stream, for those areas subject to vapor condensing conditions or to other change in physical state of a fluid in contact with a surface, particularly a metal surface. It is also an object of this invention to provide means for finding the rate of corrosion in an environment of changing physical state by measuring the change in electrical resistivity of a sample of material.

The invention is well illustrated with reference to conditions of vapor condensation and the following description of a preferred embodiment is directed to such environment. Generally, this invention is carried out by inserting a probe into the stream line at a point just upstream from the area wherein the condensing conditions prevail. The probe comprises essentially a corrosion-resistant outer shell in which is held a tubular sample element preferably having thin walls, made of the material which is desired to be tested. Means are provided for circulating through such tube a cooling medium sufficient to cause condensation upon the outer surface of said tube. Other means are provided for measuring the change in conductivity of said thin-walled tube as it is corroded away.

The drawing is a longitudinal sectional view of a probe which is illustrative of this invention.

A probe shell 13 and yoke 12, composed of a suitable corrosion-resistant material such as stainless steel, is filled with a corrosion-resistant dielectric filler 14. Composition of the filler will generally be chosen with regard to intended service conditions and may be ceramic, resins such as the epoxides, etc. A thin-walled sample tube 15, which in this example is U-shaped, is partially imbedded in the filler, the curved portion extending beyond the end of the probe shell 13. The embedded, or straight, parts of the tube, are termed the first, I, and second, II, portions; the curved part is referred to as the third, III, portion. Also imbedded in the filler 14 are electrical leads 16, 17, 18, which are each connected at one end to points along the straight portions of the U-tube 15, and two coolant tubes 19, made of a suitable metal or plastic material, which are connected to the ends of the U-tube 15 by a pair of connectors 20. In preferred forms of the invention, the sample tube is electrically insulated from the tube 13, as by using a dielectric for tubes 19 or for connectors 20.

The electrical wires 16, 17, 18 extend to the back of the probe shell 13 and are attached to a six-pin electrical connector 21. This electrical connector 21 may be connected to a resistance measuring circuit 22, containing a power source and at least one galvanometer for measuring the electrical conductivity of the exposed portions of the U-tube 15 relative to the portion imbedded in the filler material. The coolant tubes 19 extend outside of the probe tube 13 to a cooled reservoir and pumping means 23.

To insure that the main process stream will not be unduly interfered with, the probe must be designed in such a way that there will be no fluid leakage or pressure loss in the line when the probe is inserted. To accomplish this the probe tube 13 must be equipped with the proper packing glands and couplings, which are not shown here but which are old in the art, to form a vapor-tight seal when it is inserted through the walls of a conduit.

The probe tube 13 may be made of stainless steel and the filler material 14 may be a ceramic or plastic material. The coolant tubes 19 could be made of either a suitable plastic or metal, such as linear polyethylene or aluminum. The size of the probe is, of course, limited by the size of the pipe or valve into which it is inserted. The exposed tube 15 need not be U-shaped but may be spiral or any other desired shape.

To give an example of the manner of operating this invention, the probe may be inserted through a packing gland into the overhead line from a distillation column, upstream from the condenser to check the rate of corrosion of the condenser tubes. The sample tube 15, which in this case is U-shaped, is made of the same material as the condenser tubes, for example Admiralty metal. The non-corrosive coolant, such as a light non-corrosive oil, is passed through the tubes 19 and U-tube 15. Electrical wires 16 are connected to an electrical power source, which is included in the resistance measuring circuit 22, to impress a current across the U-tube 15. Wires 18 and 17 may be connected into a Wheatstone bridge circuit (also included in the resistance measuring circuit 22) in the manner known to the art, for measurement of the resistance of the exposed portion of the U-tube and the imbedded portion, respectively.

The Wheatstone bridge is balanced at the start of the run, and the increase in resistance of the exposed portion of the U-tube 15 is a measure of the corrosion which has occurred. The exposed and the imbedded portions of the U-tube are at approximately the same temperature, so that the use of the Wheatstone bridge circuit to measure the relative change in resistance serves to automatically compensate for any temperature changes during operation.

Under most circumstances, it would be undesirable to allow the sample tube to become completely corroded so that the coolant mixes with the fluid in the process stream. To prevent this from happening the probe may be removed and the sample tube replaced whenever the resistance increases beyond a point indicative of imminent failure of the sample tube wall.

This invention allows a plant operator to measure the rate of corrosion in a tube-and-sheet condenser, under actual operating conditions, without having to shut down the condenser and examine it visually. The probe is useful in circumstances where it is desirable to be able to measure the approximate corrosion rate in areas where condensation occurs without having to dismantle the equipment.

By constructing reference charts which correlate the rate of corrosion of the sample tube with the rate of corrosion of the condenser tubes, it would be possible to determine when the condenser tube should be replaced by making periodic tests with the probe to determine the corrosion rate.

It will also be possible to determine the effectiveness of corrosion inhibitors which may be added to the process stream for the purpose of reducing the amount of corrosion indigenous to the process stream.

The example given above is merely illustrative of the principle involved and is not meant in any way to limit the scope of the invention as it is defined by the claim below.

What is claimed is:

Apparatus, for measuring the corrosion of an electrically conductive material which is disposed in a fluid containing condensible gases, comprising a corrosion resistant probe shell adapted to be extended into said fluid, an elongated test element made of said electrically conductive material, first and second portions of said test element being enclosed within said probe shell and protected thereby from contact with said fluid, a third portion of said test element extending from said probe shell into said fluid and connecting said first and second portions, said test element being of tubular structure adapted for the circulation of a fluid medium through the interior thereof, pump means for controlling the temperature of said test element by passing cooling fluid therethrough, sufficient to cause condensation upon the outer surface of said test element, conduit connecting means between said pump means and said test element for the transfer of fluid therebetween, electrical conductors extending from at least one point on said first portion of said test element and from at least two points spaced apart along the length of said second portion of said test element, and a resistance measuring circuit adapted for connection to said electrical conductors.

References Cited by the Examiner
UNITED STATES PATENTS

| | | | |
|---|---|---|---|
| 2,735,754 | 2/1956 | Dravnieks | 324—65 |
| 2,864,925 | 12/1958 | Ellison | 73—86 X |
| 2,987,685 | 6/1961 | Schaschl | 324—71 |
| 2,993,366 | 7/1961 | Birkness | 324—71 X |
| 3,080,747 | 3/1963 | Kerst | 73—86 X |
| 3,156,887 | 11/1964 | Weikal | 324—71 |

WALTER L. CARLSON, *Primary Examiner.*

FREDERICK M. STRADER, *Examiner.*

J. P. O'BRIEN, C. F. ROBERTS, *Assistant Examiners.*